United States Patent [19]

Yamamoto

[11] Patent Number: 4,666,762
[45] Date of Patent: May 19, 1987

[54] SURFACE PROTECTING MATERIAL

[75] Inventor: Hiroaki Yamamoto, Yokohama, Japan

[73] Assignee: Tokai Metals Co., Ltd., Japan

[21] Appl. No.: 634,609

[22] Filed: Jul. 26, 1984

[30] Foreign Application Priority Data

Mar. 30, 1984 [KR] Rep. of Korea ............... 1678/1984

[51] Int. Cl.⁴ .................... B32B 27/00; C09J 7/02
[52] U.S. Cl. ................... 428/216; 428/352; 428/354; 428/418; 428/421; 428/422; 428/425.8; 428/450; 428/907; 428/908.8; 428/543; 427/409; 427/410; 427/214
[58] Field of Search ........... 428/335, 418, 352, 354, 428/425.8, 422, 450, 908.8, 543, 907, 421, 215, 216

[56] References Cited

U.S. PATENT DOCUMENTS

| | | | |
|---|---|---|---|
| 3,312,563 | 4/1967 | Rusch | 428/908.8 |
| 3,445,320 | 5/1969 | Boivin | 428/908.8 |
| 3,504,789 | 4/1970 | Bosewicz | 428/354 |
| 4,368,235 | 1/1983 | Vaughn, Jr. | 428/450 |
| 4,376,801 | 3/1983 | Schardein | 428/421 X |
| 4,519,154 | 5/1985 | Molari, Jr. | 428/421 X |

Primary Examiner—P. C. Ives
Attorney, Agent, or Firm—Parkhurst & Oliff

[57] ABSTRACT

A surface protecting material is prepared by having a soft aluminum foil having a thickness of 15 to 50μ superposed on the surface of a substrate of plastic film such as polyethylene, polyvinyl chloride, or polyester and further having a layer of resin containing at least 10% fluorine resin or silicone resin and having not more than 1μ in surface coarseness superposed directly on the surface of the aluminum foil or indirectly thereon through the medium of a colored layer formed thereon. This surface protecting material is useful for decorating and repairing various kinds of goods and to obtain a flat surface thereon.

14 Claims, 6 Drawing Figures

SURFACE PROTECTING MATERIAL

BACKGROUND OF THE INVENTION

The present invention relates to a surface protecting material. The surface protecting material is suitable for decoration and repair of room interiors, furniture, kitchen articles, signboards, bulletin boards, bridges, swimming pools, and inner and outer surfaces of water storage tanks. It is also suitable for decoration and repair of roofs and inner and outer surfaces of plants, houses, automobiles, refrigerator cars, ships and boats, and surfaces of multi-story buildings, sashes, smoke stacks and towers. Additionally, it is suitable for decoration and repair of sliding surfaces such as surfaces of skis, sleds, and slides; surfaces which are liable to gather dirt and require cleaning for removal of adhering matter, and other surfaces which are required to maintain a sliding property. Finally, it is suitable for protection of eaves and roofs against damage from heavy or fallen snow.

Previously, processed papers and plastic sheets have been used for the decoration of room interiors, furniture, and other similar articles. Because of their poor resistance to water and weather conditions, however, they have proved unsuitable for use on kitchen articles, bathroom interiors, cooking tables, as well as roofs of houses and automobiles which by their nature are exposed to moisture. Colored resin-coated iron sheets, for example, have been available in the market as roofing materials. Such roofing materials, however, are disadvantageous in that they are neither readily used by laymen nor easily conformable to varying contours and they inevitably require the use of special skill.

Metallic roofs such as roofs of galvanized iron sheets often have their surfaces painted for protection from the elements. In the course of prolonged exposure, however, the coatings peel, gather rust, and lose surface smoothness. Such adverse developments have been previously overcome by the application of paint. This process, however, requires repeated application of paint. Moreover, when the metallic roofs become so deteriorated that holes develop and rainwater leaks through the roof they cannot be repaired by laymen. This problem has previously not been solved.

In the case of swimming pools, tanks for storing hot or cold water, air-conditioners for use in buildings, tanks for waste water disposal, and pipes which collect fur or slime and algae on their wall surfaces, and ships which attract marine algae and shells on their external surfaces, a method has been adopted involving coating such wall surfaces with rustproofing paints, algicides and anti-shell agents. The paints and other agents applied to surfaces according to this method, however, present a problem in that they are poisonous. Also, in the case of swimming pools, since chlorine-based reagents are used for sterilization purposes, a problem arises in that ordinary materials yield to the action of such reagents.

In the case of refrigerator cars and cold storage containers their inner wall surface gather moisture from the ambient air so that they must be periodically cleaned to remove sheets of ice. An additional problem arises in that such moisture adhered to the contacting portions of doors of the refrigerator cars and cold storage containers is frozen, thereby preventing the doors from opening smoothly. To counteract ice formation, antifrost agents have been used, but this method, however, has not been very effective.

In locations experiencing heavy snowfall, inhabitants are burdened with the task of removing snow from the roofs of their houses several times during the winter. This work demands much time and labor.

SUMMARY OF THE INVENTION

This invention is directed to solving the various problems mentioned above by providing a surface protecting material which can be easily used even by laymen for decorating and repairing articles of furniture and other items.

An object of this invention is to provide a surface protecting material which readily forms a surface capable of peventing adhesion of muddy water, ink, paint, oils and fats, dirt, dust, snow, ice, water, and water drops and enables such adhesive matter to fall off naturally or to be easily swept or wiped off.

Another object of this invention is to provide a surface protecting material which forms a surface capable of preventing adhesion of fur, slime, algae, marine algae, and other living organisms such as shells and enables such adhesive matter to be easily removed.

Yet another object of this invention is to provide a surface protecting material which readily forms a surface resistant to corrosion.

Still another object of this is to provide a surface protecting material which readily forms a slippery surface.

A further object of this invention is to provide, with a surface that requires no maintenance for walls of smoke stacks, towers, and multi-story buildings which, because of great height, do not allow easy access to cleaning.

DETAILED DESCRIPTION OF THE INVENTION

Figure 1:
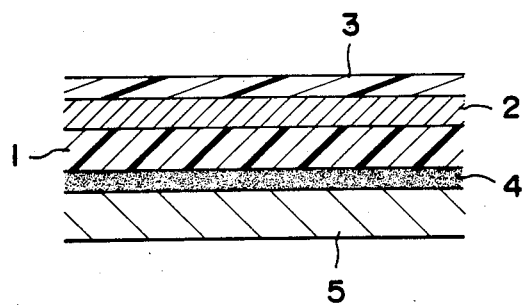
FIGS. 1–3 are enlarged cross sections depicting typical constructions of the surface protecting material of the present invention.

The surface protecting material of the present invention is characterized by having a layer of soft aluminum foil having a thickness of 15 to 50$\mu$ superposed on the surface of a substrate of plastic film such as polyethylene, polyvinyl chloride, or polyester and further having a layer of resin containing at least 10% fluorine resin or silicone resin having not more than 1$\mu$ in surface coarseness superposed directly on the surface of the aluminum foil layer or indirectly thereon through a colored layer. Optionally, the surface protecting material of the present invention may have a self-adhesive applied to the rear surface of the film substrate and a release paper superposed on the surface of the applied layer of self-adhesive agent.

The plastic film to be used as the substrate in this invention is a film, particulary a soft film, of polyethylene, polypropylene, polyester, or polyvinyl chloride which has a thickness of not more than 100$\mu$, and preferably has a thickness of 10 to 50$\mu$. The thickness of the film is not desired to be too great, since the fabricability, workability and cost of the film is dependent upon the thickness of the film. If the film is too thin, however, it tends to wrinkle while it is being handled during the fabrication of the surface protecting material. Further, if the film of a surface protecting material applied to the surface of a metallic product is too thin, the material is disadvantageous since pinholes or ruptures of the film may be created during the fabrication of the surface protecting material and the superposed aluminum foil would then be directly or indirectly in contact with the metallic product to induce galvanic corrosion. For the prevention of such troubles and for permitting the application of an adhesive agent, the film is required to have a certain thickness, preferably in the range of 10 to 50μ. The plastic film used in the surface protecting material is highly effective in protecting the aluminum foil from corroding.

From the standpoint of workability, the aluminum foil is desired to be soft. It may have a glossy or matte surface. The thickness of the aluminum foil is selected to be in the range of 15 to 50μ. When desired, the aluminum foil may be printed or colored. For coloration, deposition of a transparent colored coating layer proves advantageous where the metallic gloss of the aluminum foil is required to be retained. The stiffness derived from the presence of the aluminum foil gives thd surface protecting material good workability as a repairing material. The presence of the aluminum foil also allows the surface protecting material to withstand heat and imparts thermal and dimensional stability to the surface protecting material and prevents edge curling and shrinkage. Further, the aluminum foil satisfactorily intercepts various rays of light and reflects heat rays to prevent an otherwise possible increase of temperature inside the surface protecting material. Optionally, the colored layer may be formed as a black-colored layer for permitting absorbance of solar heat to contribute to the utilization of solar heat.

With respect to the layer of resin containing a fluorine resin or a silicone resin, examples of fluorine resin that may be used include polytetrafluoroethylene (PTFE), tetrafluoroethylene-perfluoroalkylvinyl ether copolymer (PFA), tetrafluoroethylene-hexafluoropropylene copolymer (FEP), polychlorotrifluoroethylene (PCTFE), tetrafluoroethylene-ethylene copolymer (ETFE), chlorotrifluoroethylene-ethylene copolymer (ECTFE), polyvinylidene fluoride (PVDF), and polyvinyl fluoride (PVF).

Examples of the silicone resin that may be used include methyl silicone and phenylmethyl silicone.

Examples of the base resin which can contain such fluorine resins or silicon resins include resins of peculiar qualities such as polysulfone, alkyd resin, amino resin, polyester resin, phenolic resin, allyl resin, polyaryl sulfone, urethane resin, polybenzimidazole, polyamide-imide, polyphenylene sulfide, polyphenylene, polyphenylene oxide, polyoxybenzoyl ester, polyether sulfone, polyimide, epoxy resin, polyethylene, polypropylene, ionomer, acrylic resin, nylon, and polyvinyl chloride. Such a resin may be present in any form such as a dispersion, an emulsion, a solvent-based coating, a powder, or fine particles. This resin, containing a suitable proportion of the aforementioned fluorine resin or silicone resin, is deposited in the form of a layer.

The content of the fluorine resin or silicone resin may range from 10 weight percent up to and including 100 weight percent. To accomodate the peculiar properites possessed by the base resin, the content of the fluorine resin or silicon resin is preferably in the range of 50 to 99 weight percent.

The fluorine resin or silicone resin is used in the layer of resin because it posesses water repellency, wear resistance, minimal friction (lubricity), resistance to chemicals, resistance to solvents, resistance to the action of food stains, resistance to oil, resistance to weather conditions, heat resistance, thermoresistance adhesion, good electric properties, and flame retardancy. These properties are particularly significant when the surface protecting material of the present invention is applied as a roofing material for houses, a chute for snow dumped from roofs in snowy areas, a decorative or reinforcing coating, a covering for the inner walls of refrigerator cards or blades of ventilation fans, as bulletin boards and signal boards, and skis and boats, and further as decorative or repairing coatings for the inner walls of structures likely to be smeared with oil, ink, and blood, such as bathrooms. In the former applications, moderately low friction is necessary for ensuring a smooth fall of snow or preventing the adhesion of sand, dust and dirt. Weatheraility is also an important requirement. In the latter appliations, prevention adhesion of ice sheets is an indispensable requirement in addition to the requirements of low friction, resistance to the action of food stains, and resistance to oil. The surface protecting material of the present invention may also be applied to the inner and outer surfaces of a smoke stack for the prevention of soot deposition. To offer the properties required for such applications, the fluorine resin or silicone resin, depending on the particular type selected, may be present at 100 weight percent. By suitably selecting the type and mixing ratio of the base resin and by varying the amount of the added fluorine resin or silicone resin, the desired properties may be imparted to the layer of resin.

The formation of the aforementioned layer of resin in the manufacture of the surface protecting material of the present invention may be effected by applying the resin solution directly to the surface of the aluminum foil. It may also be accomplished by first forming a film of the resin solution by any known method and then applying the film to the surface of the aluminum foil with, or without, the aid of an adhesive agent.

For the layer of resin to acquire the aforementioned properties, it is desired to have a surface coarseness of not more than 1μ in irregularity. To produce a surface with this degree of flatness, a molten freshly extruded film may be pressed with rolls having a surface coarseness of not more than 1μ. Also, the resin solution may be applied to the surface of a glass or metallic plate having the aforementioned degree of coarseness to form a film thereon and then removing the film from the plate.

In the formation of the layer of resin, the layer is preferably baked when it contains a fluorine resin. Depending on the type of resin, the film, after being dried, is baked at a temperature in the range of 200° to 450° C. under atmospheric or reduced pressure.

The adhesion of resin film in the formation of the layer of resin is preferably effected by dry lamination techniques. It may also be effected by the application of both heat and pressure. Typical examples of the adhesive used in this case are polyurethane and acrylic resin.

When the surface protecting material is intended for use as a roofing material, the layer of resin must have a sufficient thickness to endure harsh conditions, resist weather conditions, offer durability, and withstand the friction of sliding snow. If the thickness of the resin layer exceeds 50μ, the fabricability and workability of the surface protecting material are deteriorated and the cost of the material are increased. Therefore the thickness of the resin layer preferably is not more than 50μ. Generally, it is selected in the range of 20 to 40μ.

For application of an adhesive to the rear surface of the film substrate any of the self-adhesive agents known in the art must be used. The adhesive agent is applied in a thickness within the range of ordinary thickness of adhesive agents, i.e. from 10 to 100μ, and preferably in the neighborhood of 40μ.

Ordinary silicone-treated paper or polyethylene film may be used as the release paper. When a small thickness of surface protecting material of the present invention is designed to be used, the release paper preferably has a relatively large thickness.

Since the surface protecting material of the present invention has a non-sticky surface, it may be wound in a coil in much the same way as ordinary self-adhesive tape is coiled, with no release paper attached to the surface of the self-adhesive.

The surface protecting material of the present invention may be used, as described above, in the form of a tape. It may also be produced in the form of roll having a width of 500 to 1000 mm. or even more. Of course, it may be produced in the form of a flat sheet.

A specific construction of the surface protecting material of the present invention will now be described with reference to the accompanying drawings.

FIG. 1 is an enlarged cross section illustrating a basic construction of the surface protecting material of the present invention. In the illustrated embodiment, aluminum foil 2 and a layer of resin 3 are superposed on the surface of a film substrate 1 with self-adhesive agent 4 and release paper 5 applied to the rear surface of substrate 1.

Figure 2:
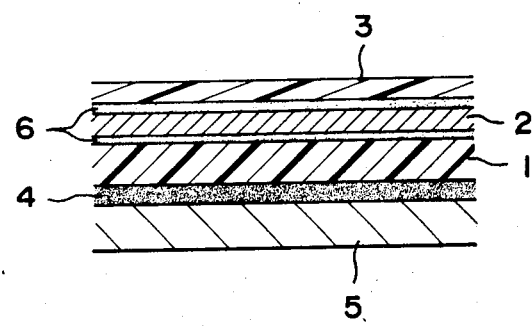
Figure 3:
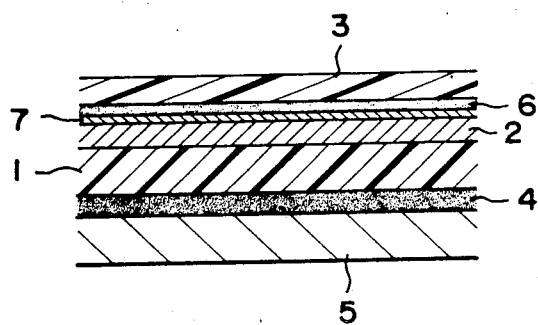

FIG. 2 illustrates a second embodiment which involves the use of adhesive 6 for the superposition of the aluminum foil 2. FIG. 3 illustrates a third embodiment in which a printed colored layer 7 is formed on the surface of the aluminum foil 2 and the surface layer of resin 3 is superposed through the medium of an adhesive 6.

Now, the effect of the surface protecting material of the present invention will be described with reference to certain test examples.

Test Examples 1 (wind tunnel test)

A polypropylene film substrate having a thickness of 50μ, a soft aluminum foil having a thickness of 40μ and a surface resin layer of polyvinyl fluoride having a thickness of 25μ were laminated in a construction as shown in FIG. 1. A self-adhesive agent was applied to the entire rear surface of the substrate to complete the surface protecting material of the present invention. Assuming that this surface protecting material would be used as a roof repair material, its behavior under wind pressure was tested.

Figure 4:
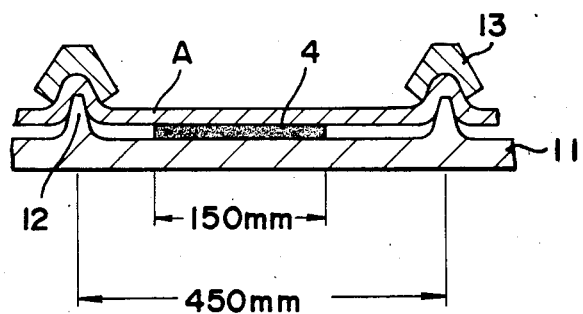
FIGS. 4–6 are side view illustrating a method for a wind pressure test.
Figure 5:
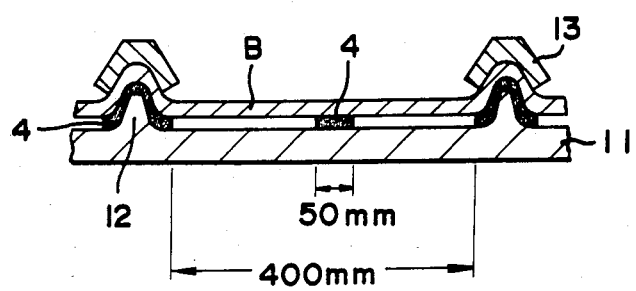
Figure 6:
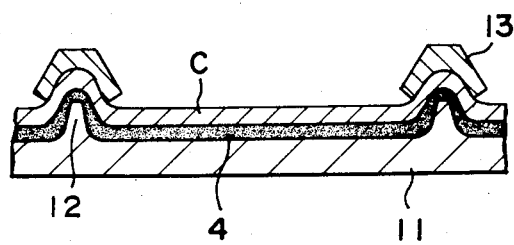

The test was performed by preparing an iron sheet 11 having support points 12 projected in the form of cross pieces along opposite ends separated by 450 mm. as illustrated in FIGS. 4-6, stretching a given specimen, A-D, between the support points 12, fixing the opposite ends of the specimen to the support points 12 with clips 13, and then exposing the specimen to wind pressure. The results of the test were rated by visual inspection of the test specimen. The results are shown in Table 1.

Specimens A and B, had self-adhesive agents 4 applied to 150 mm. and 50 mm. of the rear surface of the substrate respectively, as illustrated in FIGS. 4-5. Specimen C had self-adhesive 4 applied to the entire rear surface of the substrate. Specimen D had the identical surface protecting material construction of specimen C but without the aluminum foil.

TABLE 1

| Specimen | Wind pressure (kg/mm$^2$) | Wind velocity (m/sec.) | Results |
| --- | --- | --- | --- |
| A | −80 | 35 | The specimen inflated. |
| B | −160 | 50 | The specimen inflated. |
| C | −280 | 66 | Absolutely no change. |
| D | −160 | 50 | The specimen inflated. |

From the data in Table 1, it is apparent that the specimen having self-adhesive applied to the entire surface endured a fairly high wind velocity. In contrast, speciment D which did not contain aluminum foil, had a low stiffness and failed to conform to the irregular surface of the iron sheet of the test stand, and consequently, was observed to bulge and come off with wind pressure.

Test Example 2 (weatherability of self-adhesive agent)

Specimens of the following constructions were prepared for the weatherability test.

Specimen 1—Polyvinyl fluoride (25μ)/self-adhesive agent

Specimen 2—Polyvinyl fluoride (25μ)/aluminum foil (25μ)/polypropylene (50μ)/self-adhesive agent The self-adhesive was an acrylic resin type and was applied by dry lamination techniques.

The aforementioned specimens, cut in the size of a 10 cm. square, were applied to the surface of a galvanized iron sheet and subjected to a sunshine-dew cycle test of exposure to sunshine for 60 minutes and to dew condensation for 60 minutes.

In the test, the specimen 1 sustained peeling along the edge after standing 300 hours, while specimen 2 of the present invention showed absolutely no sign of peeling even after standing 1000 hours. This sharp contrast indicates that the aluminum foil effectively intercepted solar rays, especially ultraviolet solar rays.

The surface protecting material of the present invention, as described above, has a layer resin containing fluorine resin or silicone resin which excels in various properties such as peelability, lubricity, and weatherability, superposed on a soft plastic film through the medium of soft aluminum. This surface protecting material possesses flexibility and, at the same time, exhibits the property of conforming to the irregular contour of a given surface under treatment. Particularly, the incorporation of aluminum foil which transfers heat, intercepts light, and stops the passage of gas, protects the adhesive agent and the substrate film against deterioration and enables the surface protecting material to enjoy a long service life. further, since the surface protecting material has a self-adhesive applied to the entire surface with release paper covering the layer of self-adhesive, it is incapable of wrinkling while it is being handled. In the actual use of the surface protecting material, it can be easily applied to a given surface sequentially from one end to the other by peeling off the release paper and, at the same time, press-fitting the peeled-off portion. In this manner, even a layman can simply apply this material to a surface of great area without causing air to be entrapped in the interface and without wrinkling the material. If in material of this kind used for repairing a roof, wrinkles are created or air is entrapped in the interface between the applied material and the surface of the roof, the voids in the interface may cause the material to peel off in strong wind or to be washed away by sliding snow. Further, the oxygen in the trapped air has the possibility of oxidizing the self-adhesive agent. In the case of the surface protecting material of the present invention, however, the flexibility of the plastic substrate and the shape-retaining property of the aluminum foil allows an airtight application of the surface protective material to surfaces of the object to be applied having various kinds of surfaces, without causing the above-mentioned defects.

Examples of applications in which the surface protecting material of this invention proves useful are as follows:

1. The surface protecting material is applied to the roof and frontages of a house in a snowy area to prevent snow from piling at and protruding from the edge of eaves in the shape of a sun-visor.

2. The surface protecting material is applied to the exterior and interior of an automobile or refrigerator car, for example, to the inside of a fender, or a wheel housing etc. thereof, to prevent muddy water from adhering to the covered surface.

3. The surface protecting material is applied to the inner wall surface of a hopper or chute for conveying fine grains, divided particles or powders such as plastic chips or flour to decrease the friction and improve the lubricity of the surface. It is also applied to the outer wall surface to protect it against deposition of such fine particles, or to prevent corrosion thereon.

4. The surface protecting material is applied to the interior of a laboratory or surgical operation room or is used for coating the inner walls of a plant, a printing house, or a paper cutting room.

5. The surface protecting material is used for coloring and corrosion proofing sashes.

6. The surface protecting material is used for covering the inner walls and particularly a ceiling in a bathroom or other similar room exposed to high humidity to prevent the adhesion of waterdrops.

7. The surface protecting materal is used for coating the outer surface of a tower or smoke stack to protect the surface against corrosion and preclude the adhesion of soot and dirt.

8. The surface protecting material is applied to the surface of skis, a sled, or a slide to improve lubricity of the surface.

9. The surface protecting material is applied to the inner and outer surfaces of a tank, a swimming pool, a sewage conduit, a water pipe, a ship, or a boat to protect the surfaces against corrosion and deposition of fur, slime, algae, and shells. It also proves to be effective in preventing formation of dew on the surfaces.

10. The surface protecting material is applied to the inner and outer wall surfaces of an outdoor or indoor swimming pool, and particularly to the ceiling and walls in the case of an indoor swimming pool, to protect the surfaces against corrosion. The surface protecting material can be applied to a slide to prevent bather's swimming suits from being worn out by friction.

11. The surface protecting material is used as a surface material for a signboard, a sign post, bulletin board or a sticker to protect the surface against adhesion of dirt, dust, snow, and rainwater. It is applied to a bridge or a girder of a bridge to protect the surface against adhesion of defiling matter and prevent it from corrosion.

12. The surface protecting material is used for covering the inner and outer walls of a house for protection against defilement. It is also used on furniture and kitchen articles for the same purpose. It is applied to a roof or the upper surface (roof top) of a concrete building or a veranda for the prevention of water leakage.

13. In a snowy area, the surface-protecting material is applied to the joint faces of a house door or to a car door to preclude the possibility of the door being stuck with hard frozen ice. It is similarly used on the door of a freezer or a refrigerator car.

The conventional surface protecting material which has only a fluorine resin superposed on a substrate has suffered from the disadvantage that it sustains cracks because it does not easily withstand a change in temperature. The surface protecting material of the present invention, however, is free from this trouble because it employs an aluminum foil. When it is used for roof repair, for example, it protects the roof from leakage of rainwater. It has a salient advantage in that by suitably selecting the amount of fluorine resin or silicone resin contained in the layer of resin and the kind of the base resin and the mixing ratio thereof, desired various properties such as heat resistance, adhesiveness, weatherability, durability, low friction, resistance to chemicals, resistance to solvents, resistance to the actions of food stains, and resistance to oils can be desirably imparted to the produced surface protecting material. It will find extensive utility in a wide variety of applications and fulfill the demands of the population at large.

What is claimed is:

1. A surface protecting material, comprising:
   a soft plastic film substrate having a thickness of between 10 and 100$\mu$ and having a surface and an undersurface;
   a layer of soft aluminum foil having a thickness of from 15 to 50$\mu$ superposed on the surface of said plastic film substrate;
   a resin layer superposed on said layer of aluminum foil, said resin layer containing at least 10% of a fluorine resin and having a thickness of 20–50$\mu$ and less than 1$\mu$ in surface coarseness; and
   an adhesive layer having a thickness of 10–100$\mu$ positioned on the undersurface of the substrate.

2. The surface protecting material of claim 1, wherein a colored coating layer is disposed between said resin layer and said aluminum foil.

3. The surface protecting material of claim 1, wherein said adhesive layer has an adhesive surface and a release paper is applied to the adhesive surface.

4. The surface protecting material of claim 3, wherein said resin layer comprises polytetrafluoroethylene.

5. The surface protecting material of claim 1, wherein said resin layer contains a base resin selected from the group consisting of urethane resin, epoxy resin and acrylic resin.

6. The surface protecting material of claim 1, wherein said film substrate comprises a vinyl polymer selected from the group consisting of polyethylene, polypropylene and polyvinyl chloride.

7. A surface protecting material, comprising
   a plastic film substrate having a thickness of between 10 and 100$\mu$ and having a surface and an undersurface;
   a layer of aluminum foil having a thickness of from 15 to 50$\mu$ superposed on the surface of said plastic film substrate;

a resin layer superposed on said layer of aluminum foil, said resin layer comprising at least 10% fluorine resin and having a thickness of between 20 and 50μ and less than 1μ in surface coarseness;
a colored coating layer disposed between said resin layer and said layer of aluminum foil; and
an adhesive layer having a thickness of 10-100μ provided on the undersurface of the substrate.

8. A method for protecting a surface from adverse environments, said method comprising applying to said surface a surface protecting material comprising a plastic film substrate, a layer of aluminum foil having a thickness of from 15 to 50μ superposed on the surface of said plastic film substrate, and a resin layer superposed on said layer of aluminum foil, said resin layer having a thickness of 20-50μ and containing at least 10% of a fluorine resin and having less than 1μ in surface coarseness.

9. The method of claim 8, wherein said surface comprises a surface while in normal use is exposed to snow and ice.

10. The method of claim 8, wherein said adverse environment comprises an environment in which fur, slime, algae or shells would attach to said surface.

11. The method of claim 10, wherein said surface is selected from the group consisting of a water storage tank surface, a wastewater pipe surface and a swimming pool surface.

12. The method of claim 9, wherein said surface is on an article selected from the group consisting of skis, sleds and snow slides.

13. The method of claim 8, wherein said adverse environment comprises an environment in which ink, muddy water or oil would in normal use attach to said surface.

14. The method of claim 9, wherein said surface comprises a roof.

* * * * *